United States Patent
Wiegman

(10) Patent No.: US 12,191,683 B2
(45) Date of Patent: Jan. 7, 2025

(54) CHARGER CONNECTOR FOR AN ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 51 days.

(21) Appl. No.: 18/116,190

(22) Filed: Mar. 1, 2023

(65) Prior Publication Data
US 2023/0202318 A1   Jun. 29, 2023

Related U.S. Application Data

(63) Continuation of application No. 17/733,212, filed on Apr. 29, 2022, and a continuation of application No. 17/563,152, filed on Dec. 28, 2021, now Pat. No. 11,613,185.

(51) Int. Cl.
| | |
|---|---|
| *H02J 7/00* | (2006.01) |
| *B60L 53/16* | (2019.01) |
| *B60L 53/35* | (2019.01) |
| *B60L 53/62* | (2019.01) |
| *B60L 53/68* | (2019.01) |
| *B64F 1/36* | (2017.01) |
| *B64C 29/00* | (2006.01) |
| *B64D 27/24* | (2006.01) |

(52) U.S. Cl.
CPC .......... *H02J 7/00032* (2020.01); *B60L 53/16* (2019.02); *B60L 53/35* (2019.02); *B60L 53/62* (2019.02); *B60L 53/68* (2019.02); *B64F 1/362* (2013.01); *H02J 7/0045* (2013.01); *B60L 2200/10* (2013.01); *B64C 29/0008* (2013.01); *B64D 27/24* (2013.01)

(58) Field of Classification Search
CPC ...... H02J 7/00032; B60L 53/16; B60L 53/35; B60L 53/62; B60L 53/68
See application file for complete search history.

(56) References Cited

U.S. PATENT DOCUMENTS

| | | | |
|---|---|---|---|
| 6,225,153 B1 | 5/2001 | Neblett et al. | |
| 7,411,371 B2 | 8/2008 | Hobbs | |
| 10,950,974 B2 | 3/2021 | Schreiber et al. | |
| 11,437,763 B1 * | 9/2022 | Wiegman | H02J 7/0042 |
| 2013/0169226 A1 * | 7/2013 | Read | B60L 50/30 |
| | | | 320/109 |
| 2014/0035527 A1 * | 2/2014 | Hayashigawa | B60L 3/0023 |
| | | | 320/109 |

(Continued)

FOREIGN PATENT DOCUMENTS

| | | |
|---|---|---|
| DE | 102019008060 | 7/2020 |
| DE | 102019008060 A1 | 7/2020 |

(Continued)

*Primary Examiner* — Richard V Muralidar
(74) *Attorney, Agent, or Firm* — Hoffman Warnick LLC

(57) ABSTRACT

Aspects relate to a connector of a charger and methods of use terminating a charging connection between the charger and an electric aircraft. A connector includes a controller that is configured to receive a control signal from a remote device and terminate the charging connection in response to the control signal.

18 Claims, 9 Drawing Sheets

(56) References Cited

U.S. PATENT DOCUMENTS

| | | |
|---|---|---|
| 2020/0189416 A1 | 6/2020 | Jung et al. |
| 2021/0053456 A1 | 2/2021 | Freeling-Wilkinson |
| 2021/0107648 A1 | 4/2021 | Augugliaro et al. |

FOREIGN PATENT DOCUMENTS

| | | |
|---|---|---|
| WO | 2013063306 | 5/2013 |
| WO | 2021007496 | 1/2021 |

\* cited by examiner

CHARGER CONNECTOR FOR AN ELECTRIC AIRCRAFT

CROSS-REFERENCE TO RELATED APPLICATIONS

This application is a continuation of Non-provisional application Ser. No. 17/563,152 filed on Dec. 28, 2021 and entitled "CHARGING CONNECTOR FOR AN ELECTRIC AIRCRAFT," the entirety of which is incorporated herein by reference. This application additionally claims the benefit of priority of U.S. patent application Ser. No. 17/733,212, filed on Apr. 29, 2022, and titled "CHARGING PORT OF AN ELECTRIC AIRCRAFT," which is incorporated by reference herein in its entirety.

FIELD OF THE INVENTION

The present invention generally relates to the field of electric aircraft. In particular, the present invention is directed to a connector of an electric aircraft charger and methods for terminating a charging connection using the connector.

BACKGROUND

Electric aircraft hold great promise in their ability to run using sustainably source energy, without increase atmospheric carbon associated with burning of fossil fuels. Perennial downsides associated with electric aircraft, include poor energy storage and therefore range of operation, as well as long times to recharge on board batteries.

SUMMARY OF THE DISCLOSURE

In an aspect, a connector of a charger is provided. The connector includes a housing configured to attach with an electric aircraft port of an electric aircraft to facilitate a charging connection between the charger and the electric aircraft, wherein the housing comprises a fastener for removable attachment with the electric aircraft port. The connector further including a contactor wherein the contactor is configured to selectively disengage the electric communication of the charging connection. The connector further including a conductor configured to conduct a current of the charging connection. The connector further including a control circuit configured to receive a control signal from a remote device; and terminate the charging connection between the charger and the electric aircraft as a function of the control signal using the contactor.

In another aspect, a method of terminating a charging connection using a connector is provided. The method includes attaching, by a fastener of a housing of the connector, the housing of the connector to an electric aircraft port of an electric aircraft to facilitate a charging connection between the charger and the electric aircraft. The method further includes conducting, by a conductor of the connector, a current of the charging connection. The method further includes receiving, by a control circuit of the connector, a control signal from a remote device. The method further includes terminating, by the control circuit, the charging connection between the charger and the electric aircraft as a function of the control signal and using a contactor, wherein the contactor is configured to selectively disengage the electric communication of the charging connection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a connector of a charger configured to terminate a charging connection between the charger and an electric aircraft. In an embodiment, aspects relate specifically to a connector of a charger interfacing with an electric aircraft to charge and/or recharge a power source of the electric aircraft. Connector may include multiple interfaces required for fast charging of electric aircraft. Aspects of the present disclosure can be used to connect with communication, control, and/or sensor signals associated with an electric aircraft during charging, thereby allowing for monitoring of the charge and feedback control of various charging systems, for example power sources and coolant sources.

Figure 1:
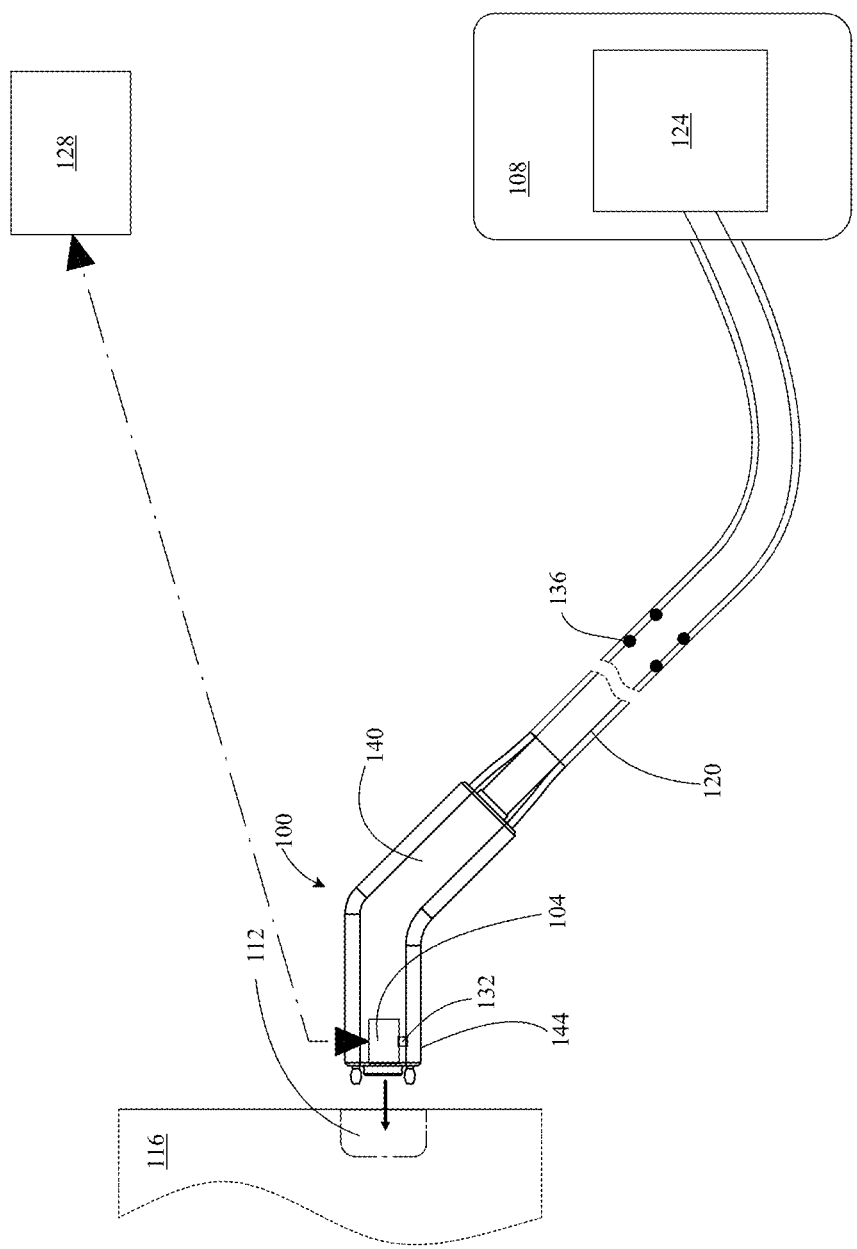
FIG. 1 is a block diagram illustrating an exemplary system for charging an electric aircraft.

Referring now to FIG. 1, an exemplary embodiment of a connector 100 of a charger 108 for terminating a charging connection between an electric aircraft 116 and charger 1008 is illustrated in accordance with one or more embodiments of the present disclosure. In one or more embodiments, charger 108 may allow a recharging of electrical aircraft 116 via a charging connection between electric aircraft 116 and charger 108, while connector 100 of charger 108 may terminate charging connection in response to a control signal from a remote device 128. As used in this disclosure, "charging" refers to a process of increasing energy stored within an energy source. In some cases, an energy source includes a battery or battery modules, and charging includes providing an electrical current to the battery.

Still, referring to FIG. 1, connector 100 includes a housing 140 configured to attach with an electric aircraft port 112 (also referred to herein as a "port") of an electric aircraft 116 to facilitate a charging connection between charger and the electric aircraft, wherein the housing comprises a fastener for removable attachment with the electric aircraft port. In one or more embodiments, connector may be placed at a distal end of a tether or a bundle of tethers, e.g., hose, tubing, cables, wires, and the like, which is configured to removably attach with a mating component, for example without limitation a port. In the case of a computing device port, the port may provide an interface between a signal and a computing device. A connector may include a male component having a penetrative form and port may include a female component having a receptive form that is receptive to the male component. Alternatively or additionally, connector may have a female component and port may have a male component. In some cases, connector may include multiple connections, which may make contact and/or communicate with associated mating components within port, when the connector is mated with the port. Connector may be consistent with disclosure of connector in U.S. patent application Ser. No. 17/405,840 and titled "CONNECTOR AND METHODS OF USE FOR CHARGING AN ELECTRIC VEHICLE", which is incorporated herein by reference in its entirety.

With continued reference to FIG. 1, connector 100 may include a housing. As used in this disclosure, a "housing" is a physical component within which other internal components are located. In some cases, internal components with housing will be functional while function of housing may largely be to protect the internal components. Housing and/or connector may be configured to mate with a port, for example an electrical vehicle port 112. As used in this disclosure, "mate" is an action of attaching two or more components together. As used in this disclosure, an "electric aircraft port" is a port located on an electric aircraft 116. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 100. In some cases, mate may be lockable. As used in this disclosure, an "electric aircraft" is any electrically power means of human transport, for example without limitation an electric aircraft or electric vertical take-off and landing aircraft. In some cases, an electric aircraft will include an energy source configured to power at least a motor configured to move the electric aircraft 116.

With continued reference to FIG. 1, connector 100 and/or housing of connector may include a fastener 144. As used in this disclosure, a "fastener" is a physical component that is designed and/or configured to attach or fasten two (or more) components together. Connector may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferromagnetic material, and/or an electromagnet. Fastener may be configured to provide removable attachment between connector 100 and at least a port, for example electrical vehicle port 112. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1, connector 100 includes a conductor 120 configured to conduct a current of charging connection. In one or more embodiments, connector 100 may include one or more conductors 120 having a distal end approximately located within connector 100. As used in this disclosure, a "conductor" is a component that facilitates conduction. As used in this disclosure, "conduction" is a process by which one or more of heat and/or electricity is transmitted through a substance, for example when there is a difference of effort (i.e. temperature or electrical potential) between adjoining regions. In some cases, a conductor 120 may be configured to charge and/or recharge an electric aircraft. For instance, conductor 120 may be connected to an energy source 124 and conductor may be designed and/or configured to facilitate a specified amount of electrical power, current, or current type. For example, a conductor 120 may include a direct current conductor 120. As used in this disclosure, a "direct current conductor" is a conductor configured to carry a direct current for recharging an energy source 124. As used in this disclosure, "direct current" is one-directional flow of electric charge. In some cases, a conductor 120 may include an alternating current conductor 120. As used in this disclosure, an "alternating current conductor" is a conductor configured to carry an alternating current for recharging an energy source 124. As used in this disclosure, an "alternating current" is a flow of electric charge that periodically reverse direction; in some cases, an alternating current may change its magnitude continuously with time (e.g., sine wave).

With continued reference to FIG. 1, connector 100 may include a controller 104. In one or more embodiments, controller 104 is configured to receive a control signal from a remote device 128, such as a flight controller (shown in FIG. 6). In one or more embodiments, controller 104 may include any computing device as described in this disclosure, including without limitation a microcontroller, microprocessor, digital signal processor (DSP), logic circuit, integrated circuit (ASIC), FPGA, flight controller, control circuit, computing device, and/or system on a chip (SoC). In one or mor embodiments, controller 104 may be configured to a control charging connection between electric aircraft 116 and charger 108. In some embodiments, controller 104 may terminate or reinitiate charging connection according to a control signal, as discussed further below in this disclosure. Controller 104 may include, be included in, and/or communicate with a remote device, such as a mobile telephone or smartphone. Controller 104 may include a single computing device operating independently, or may include two or more computing devices operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

As used in this disclosure, a "control signal" is an electrical signal containing information that changes a performance of a connector and/or charger. In this disclosure, "control pilot" is used interchangeably in this application with control signal. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal includes commands to operate a contactor and/or connector 100 of charger 108, as discussed further below in this disclosure. For example, and without limitation, control signal may control flow of an electric recharging current or switches, relays, direct current to direct current (DC-DC) converters, and the like. In some cases, one or more circuits within energy source 124 or within communication with energy source 124 are configured to affect electrical recharging current according to control signal from controller 104, such that the controller 104 may control a parameter of the electrical charging current. For example, in some cases, controller 104 may control one or more of current (Amps), potential (Volts), and/or power (Watts) of electrical charging current by way of control signal. In some cases, controller 104 may be configured to selectively engage electrical charging current, for example ON or OFF by way of control signal.

In some cases, a control signal may include an analog signal or a digital signal. In some cases, control signal may be communicated from one or more sensors, for example, located within electric aircraft (e.g., within an electric aircraft port) and/or located within connector 100. In one or more embodiments, control signal is a command from a user and/or sensor to terminate a charging connection between a charger and an electric aircraft. In some cases, a sensor, a circuit, and/or a controller 104 may perform one or more signal processing steps on a signal. For instance, sensor, circuit or controller 104 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, controller 104 is configured to terminate charging connection between charger 108 and electric aircraft 116 as a function of control signal. For example, and without limitation, if a user determines that a power source of electric aircraft 116 is sufficiently charged by charger 108, then the user may send a control signal via remote device 128 to instruct controller 104 to terminate charging connection. In another example, and without limitation, a sensor and/or battery management system of a power source of electric aircraft 116 may determine that the power source is sufficiently charged and generate a control signal that instructs controller 104 to terminate charging connection. A battery management system of a power source for detecting a state of a power source may be consistent with disclosure of a battery management system in U.S. patent application Ser. No. 17/529,653 and titled "AN ELECTRIC AIRCRAFT BATTERY PACK AND METHODS OF USE", which is incorporated herein by reference in its entirety. In another example, and without limitation, a failure, emergency shutdown, and/or an undesirable occurrence may be detected by, for example, a sensor, and the charge may be terminated as a result of the detection. An emergency shutdown may be consistent with disclosure of an emergency shutdown in U.S. patent application Ser. No. 17/515,451 and titled "SYSTEMS AND METHODS FOR EMERGENCY SHUTDOWN OF AN ELECTRIC CHARGER IN RESPONSE TO A DISCONNECTION", which is incorporated herein by reference in its entirety. In one or more embodiments, charging connection may be terminated by an electric communication of charging connection being disengaged by controller 104. For example, and without limitation, an electric communication may include a current flowing through conductor 120 between electric aircraft 116 and charger 108; such an electric communication may be disengaged to terminate charging connection. Additionally or alternatively, charging connection may be terminated by a mechanic communication being disconnected by controller 104. For instance, terminating a charging connection may include a mechanical disconnection, such as a mechanical disconnection between a connector and an electric aircraft port by, for example, an actuation of an actuator. Various actuators may be used to terminate a charging connection. For example, and without limitation, an actuator may include a solenoid, servomotor, motor, electric motor, magnets, ratchet, screw, press, weight, or the like. For example, and without limitation, a fastener may detach from port 112 so that connector 100 is no longer mating port 112 and is physically separated from electric aircraft 116. In one or more embodiments, a user may decide to reinitiate charging and, thus, send a control signal via remote device 128 to instruct controller 104 to reengage and reconnect charging connection to continue with charging a power source of electric aircraft.

In one or more embodiments, controller 104 may be configured to control an electrical charging current through conductor 120. In one or more embodiments, connector 100 may be configured such that a conductor 120 may make a connection with a mating component on within an electric aircraft port 112 of electric aircraft 116 when the connector 100 is mated with electric aircraft port 112. As used in this disclosure, a "mating component" is a component that is configured to connected with at least another component, for example in a certain (i.e. mated) configuration.

With continued reference to FIG. 1, a conductor 120 may include a proximity signal conductor 120. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric aircraft port and/or test port. In some cases, a proximity signal may include an analog signal, a digital signal, an electrical signal, an optical signal, a fluidic signal, or the like. In some cases, a proximity signal conductor 120 may be configured to conduct a proximity signal indicative of attachment between connector 100 and a port, for example electric aircraft port 112.

In one or more embodiments, connector may include a proximity sensor. Proximity sensor may be electrically communicative with a proximity signal conductor 120. Proximity sensor may be configured to generate a proximity signal as a function of connection between connector 100 and a port, for example electric aircraft port 112. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port of an electric aircraft. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In one or more embodiments, control signal from controller 104 may instruct connector 100 to disengage and disconnect from a port of an electric aircraft. For example, and without limitation, controller 100 may transmit a control signal to a contactor, which may disengage an electrical connection between charging energy source 124 and electric aircraft 116. Furthermore, control signal may also be transmitted by controller 104 to a fastener of connector 100, which mechanically disconnects connector 100 from port 112. Proximity sensor may detect the physical separation between connector 100 and port 102 and, thus, generate a sensor output signal that notifies controller 104 that the charging connection between charger 108 and electric aircraft has been terminated as a function of the sensor output signal.

In one or more embodiments, connector 100 may include a sensor 132 communicatively connected to connector 100 and configured to detect a characteristic of charger 108, such as a charging connection between electric aircraft 116 and charger 108. In one or more embodiments, sensor 132 is configured to identify a communication of charging connection. For instance, and without limitation, sensor 132 may recognize that a charging connection has been created between charger 108 and electric aircraft 116 that facilitates communication between charger 108 and electric aircraft 116. For example, and without limitation, sensor 132 may identify a change in current through a connector of charger 108, indicating connector is in electric communication with, for example, port 112 of electric aircraft 116, as discussed further below. Similarly, sensor 132 may identify that a charging connection has been terminated between electric aircraft 116 and charger 108. For example, and without limitation, sensor 132 may detect that no current is flowing between electric aircraft 116 and charger 108. For the purposes of this disclosure, a "charging connection" is a connection associated with charging a power source, such as, for example, a battery of an electric aircraft. Charging connection may be a wired or wireless connection. Charging connection may include a communication between charger 108 and electric aircraft 116. For example, and without limitation, one or more communications between charger 108 and electric aircraft 116 may be facilitated by charging connection. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charger 108 and electric aircraft 116 may include an electric communication, where a current flows between charger 108 and electric aircraft 116. As used in this disclosure, "informatic communication" is an attribute wherein two or more relata interact with one another by way of an information flow or information in general. For example, an informatic communication may include a sensor of electric aircraft 116 or a remote device of electric aircraft 116 providing information to controller 104. As used in this disclosure, "mechanic communication" is an attribute wherein two or more relata interact with one another by way of mechanical means, for instance mechanic effort (e.g., force) and flow (e.g., velocity). For example, faster may physically mate with port 112 to create a mechanic communication between electric aircraft 116 and charger 108.

In one or more embodiments, communication of charging connection may include various forms of communication. For example, and without limitation, an electrical contact without making physical contact, for example, by way of inductance, may be made between charger 108 and electric aircraft 116 to facilitate communication. Exemplary conductor materials include metals, such as without limitation copper, nickel, steel, and the like. In one or more embodiments, a contact of charger 108 may be configured to provide electric communication with a mating component within port 112 of electric aircraft 116. In one or more embodiments, contact may be configured to mate with an external connector. In one or more embodiments, connector may be positioned at a distal end of a tether or a bundle of tethers, e.g., hose, tubing, cables, wires, and the like, of charger 108, and connector may be configured to removably attach with a mating component, for example and without limitation, a port of electric aircraft 116. As used in this disclosure, a "port" is an interface configured to receive another component or an interface configured to transmit and/or receive signal on a computing device. For example, in the case of an electric aircraft port, the port interfaces with a number of conductors and/or a coolant flow paths by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

In one or more embodiments, sensor 132 may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. Sensor 132 may detect a plurality of data about charging connection, electric aircraft 116, and/or charger 108. A plurality of data about, for example, charging connection may include, but is not limited to, battery quality, battery life cycle, remaining battery capacity, current, voltage, pressure, temperature, moisture level, and the like. In one or more embodiments, and without limitation, sensor 108 may include a plurality of sensors. In one or more embodiments, and without limitation, sensor 108 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 132 may be a contact or a non-contact sensor. For instance, and without limitation, sensor 132 may be connected to electric aircraft 116, charger 108, and/or a controller 104. In other embodiments, sensor 108 may be remote to electric aircraft 116, charger 108, and/or controller 104. As discussed further in this disclosure below, controller 104 may include a computing device, a processor, a pilot control, a controller, control circuit, and the like. In one or more embodiments, sensor 108 may transmit/receive signals to/from controller 104. Signals may include electrical, electromagnetic, visual, audio, radio waves, or another undisclosed signal type alone or in combination.

Sensor 132 may include a plurality of independent sensors, where any number of the described sensors may be used to detect any number of physical or electrical quantities associated with communication of charging connection. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 132 to detect phenomenon may be maintained.

Still referring to FIG. 1, sensor 132 may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 132 may include, torque sensor, gyroscope, accelerometer, torque sensor, magnetometer, inertial measurement unit (IMU), pressure sensor, force sensor, proximity sensor, displacement sensor, vibration sensor, among others. In some embodiments, sensor 132 may include a pressure sensor. A "pressure," for the purposes of this disclosure, and as would be appreciated by someone of ordinary skill in the art, is a measure of force required to stop a fluid from expanding and is usually stated in terms of force per unit area. In non-limiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. In some embodiments, the pressure sensor may be used to indirectly measure fluid flow, speed, water level, and altitude. In some embodiments, a pressure sensor may be configured to transform a pressure into an analogue electrical signal. In some embodiments, the pressure sensor may be configured to transform a pressure into a digital signal. In one or more embodiments, sensor 132 may detect a characteristic of connector 100 by detecting a pressure created by fastener attaching to port 112.

In one or more embodiments, sensor 132 may include electrical sensors. Electrical sensors may be configured to measure voltage across a component, electrical current through a component, and resistance of a component. In one or more embodiments, sensor 108 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 108, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection.

With continued reference to FIG. 1, connector 100 may include a contactor 136. As used in this disclosure, a "contactor" is an electrical component configured to selectably disengage electric communication. In some cases, a contactor may include a switch, a relay, a solenoid, a motor, or the like. At least a contactor may selectably disengage electric communication within at least a conductor 120. In some cases, a contactor may physically break a connection within a conductor to disengage electric communication. In some embodiments, a contactor may include an electrically controlled switch used for switching an electrical power circuit. In some cases, a contactor may be controlled by a circuit having a much lower power level than a switched circuit which the contactor selectably disengages. For instance, a contactor 136 comprising 24-volt coil electromagnet solenoid may switch a 230-volt motor circuit. Alternatively or additionally, in some cases, contactor 136 may be controlled in a non-electrical manner, such as without limitation pneumatically, hydraulically, mechanically, and the like. For example, without limitation in some cases, contactor 136 may be driven by compressed air. In some cases, a contactor 136 may be directly connected to high-current devices. For example, in some cases, a contactor 136 may switch more than 5 amperes or be used in electrical circuits having an electrical load greater than a kilowatt. In some cases, contactor 136 may be normally open. As used in this disclosure, "normally open" refers to a default or uncontrolled state being open, unconnected, or disengaged. In some cases, contactor 136 may be normally closed. As used in this disclosure, "normally closed" refers to a default or uncontrolled state being closed, connected, or engaged. In some embodiments, contactor 136 may be configured to control and/or suppress an arc produced when engaging, disengaging, or interrupting heavy motor currents. In one or more embodiments, charging may be regulated using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more cells may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

With continued reference to FIG. 1, contactor 136 may be configured to include contact protection. Without adequate contact protection electrical arcing during use of contactor 136 may cause significant degradation of contacts. In some cases, an electrical arc may occur between two contact points (i.e., electrodes) when contactor 136 transitions from a closed-state to an open-state (break arc) or from an open-state to a closed-state (make arc). Break arc may be substantially more energetic and more destructive than make arc. Heat produced from electrical arc may cause damage to contacts within contactor 136. For example, in some circumstances, heat may cause metal on contact to migrate with electrical current. In some circumstances. high temperature of arc (e.g., no less than 1,000° Celsius) may disassociate surrounding gas molecules creating, for example ozone, carbon monoxide, and other compounds. In some cases, arc energy may slowly destroy contact, which may, in turn, cause some material to contaminant surroundings as fine particulate matter or conductive dust. In some cases, a contactor 136 may have a life span of 1,000 to 10,00,000 operations. In some cases, contactor 136 may include an air break contactor. An air break contactor operates in air and air (at atmospheric pressure) surrounds contacts and extinguishes a break arc when interrupting the circuit. Alternatively or additionally, contactor 136 may include a vacuum contactors, wherein a vacuum surrounds contacts and thereby substantially prevents an arc from forming ionized gas (i.e., plasma). Alternatively or additionally, contactor 136 may include an inert gas contactor, wherein an inert gas surrounds contacts. Inert gas requires a higher energy density to ionize and form plasma. In some cases, a fluid flow (e.g., a jet of compressed gas) may be used to direct an arc, for example away from contacts within contactor 136.

With continued reference to FIG. 1, charger 108 may include an energy source configured to provide an electrical charging current. As used in this disclosure, a "energy source" is a source of electrical power, for example for charging a battery. In some cases, energy source 124 may include a charging battery (i.e., a battery used for charging other batteries. A charging battery is notably contrasted with an electric aircraft battery, which is located for example upon an electric aircraft. As used in this disclosure, an "electrical charging current" is a flow of electrical charge that facilitates an increase in stored electrical energy of an energy storage, such as without limitation a battery. Charging battery 124 may include a plurality of batteries, battery modules, and/or battery cells. Charging battery 124 may be configured to store a range of electrical energy, for example a range of between about 5 KWh and about 5,000 KWh. Energy source 124 may house a variety of electrical components. In one embodiment, energy source 124 may contain a solar inverter. Solar inverter may be configured to produce on-site power generation. In one embodiment, power generated from solar inverter may be stored in a charging battery. In some embodiments, charging battery may include a used electric aircraft battery no longer fit for service in a vehicle. Charging battery 116 may include any battery described in this disclosure, including with reference to FIGS. 5-12.

With continued reference to FIG. 1, conductor 120 may be in electric communication with energy source 124. As used in this disclosure, a "conductor" is a physical device and/or object that facilitates conduction, for example electrical conduction and/or thermal conduction. In some cases, a conductor may be an electrical conductor, for example a wire and/or cable. Exemplary conductor materials include metals, such as without limitation copper, nickel, steel, and the like.

In some embodiments, and still referring to FIG. 1, energy source 124 may have a continuous power rating of at least 350 kVA. In other embodiments, energy source 124 may have a continuous power rating of over 350 kVA. In some embodiments, energy source 124 may have a battery charge range up to 950 Vdc. In other embodiments, energy source 124 may have a battery charge range of over 950 Vdc. In some embodiments, energy source 124 may have a continuous charge current of at least 350 amps. In other embodiments, energy source 124 may have a continuous charge current of over 350 amps. In some embodiments, energy source 124 may have a boost charge current of at least 500 amps. In other embodiments, energy source 124 may have a boost charge current of over 500 amps. In some embodiments, energy source 124 may include any component with the capability of recharging an energy source of an electric aircraft. In some embodiments, energy source 124 may include a constant voltage charger, a constant current charger, a taper current charger, a pulsed current charger, a negative pulse charger, an IUI charger, a trickle charger, and a float charger.

Still referring to FIG. 1, in some embodiments, system 100 may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric aircraft and conductors may provide an alternating current to the electric aircraft by way of conductors 120 and connector 100. Alternatively and/or additionally, in some cases, AC-DC converter may be located outside of electric aircraft and an electrical charging current may be provided by way of a direct current to the electric aircraft. In some cases, AC-DC converter may be used to recharge a charging battery. In some embodiments, energy source 124 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, energy source 124 may provide power to the grid power component. In this configuration, energy source 124 may provide power to a surrounding electrical power grid.

Still referring to FIG. 1, in some embodiments, a direct current conductor 120 and an alternating current conductor 120 may be further configured to conduct a communication signal and/or control signal by way of power line communication. In some cases, controller 104 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor 120. Different types of power-line communications use different frequency bands. In some case, alternating current may have a frequency of about 50 or about 60 Hz. In some cases, power conductor 120 may be shielded in order to prevent emissions of power line communication modulation frequencies. Alternatively or additionally, power line communication modulation frequency may be within a range unregulated by radio regulators, for example below about 500 KHz.

Figure 2:
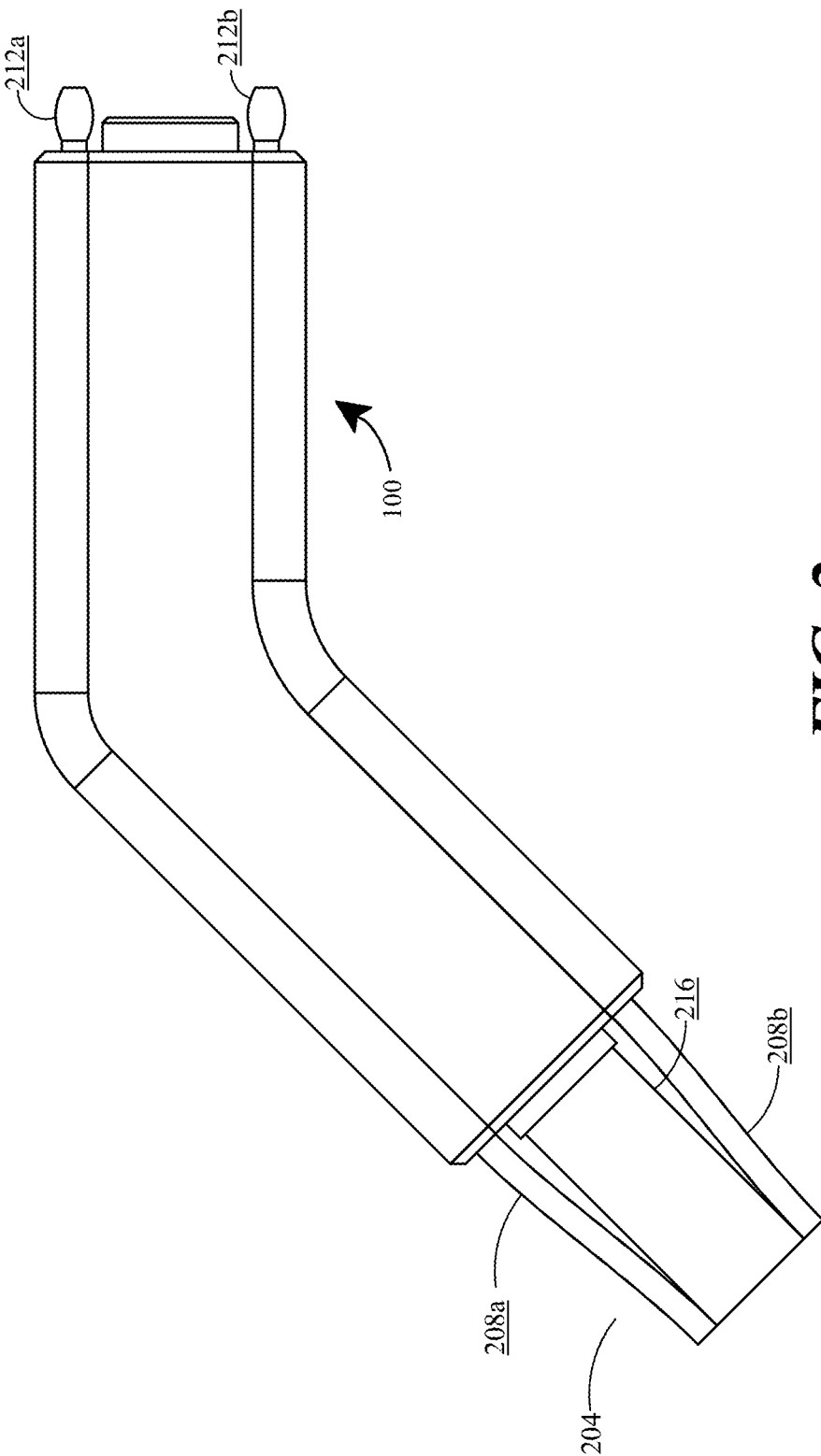
FIG. 2 illustrates an exemplary schematic of an exemplary connector for charging an electric aircraft.

Referring now to FIG. 2, an exemplary embodiment of connector 100 is schematically illustrated in accordance with one or more embodiments of the present disclosure. Connector 100 is illustrated with a tether 204. Tether 204 may include one or more conductors and/or coolant flow paths. Tether 204 may include a conduit, for instance a jacket, enshrouding one or more conductors and/or coolant flow paths. In some cases, conduit may be flexible, electrically insulating, and/or fluidically sealed. As shown in FIG. 2, exemplary connector 100 is shown with a first power conductor and a second power conductor. As used in this disclosure, a "power conductor" is a conductor configured to conduct an electrical charging current, such as, for example, a direct current and/or an alternating current, of a charging connection. In some cases, a conductor may include a cable and a contact. A cable may include any electrically conductive material including without limitation copper and/or copper alloys. As used in this disclosure, a "contact" is an electrically conductive component that is configured to make physical contact with a mating electrically conductive component, thereby facilitating electric communication between the contact and the mating component. In some cases, a contact may be configured to provide electric communication with a mating component within a port. In some cases, a contact may contain copper and/or copper-alloy. In some cases, contact may include a coating. A contact coating may include without limitation hard gold, hard gold flashed palladium-nickel (e.g., 80/20), tin, silver, diamond-like carbon, and the like.

With continued reference to FIG. 2, a first conductor may include a first cable 208a and a first contact 212a in electric communication with the first cable. Likewise, a second conductor may include a second cable 208b and a second contact 212b in electric communication with the second cable. In some cases, connector 100 may also include a coolant flow path 216. In one or more embodiments, contacts 212a,b may be prongs that extend from housing 140 of connector 100. In one or more exemplary embodiments, contact 212a,b may be retractable prongs so that a mechanic communication may be disconnected when charging connection is terminated.

Figure 3:
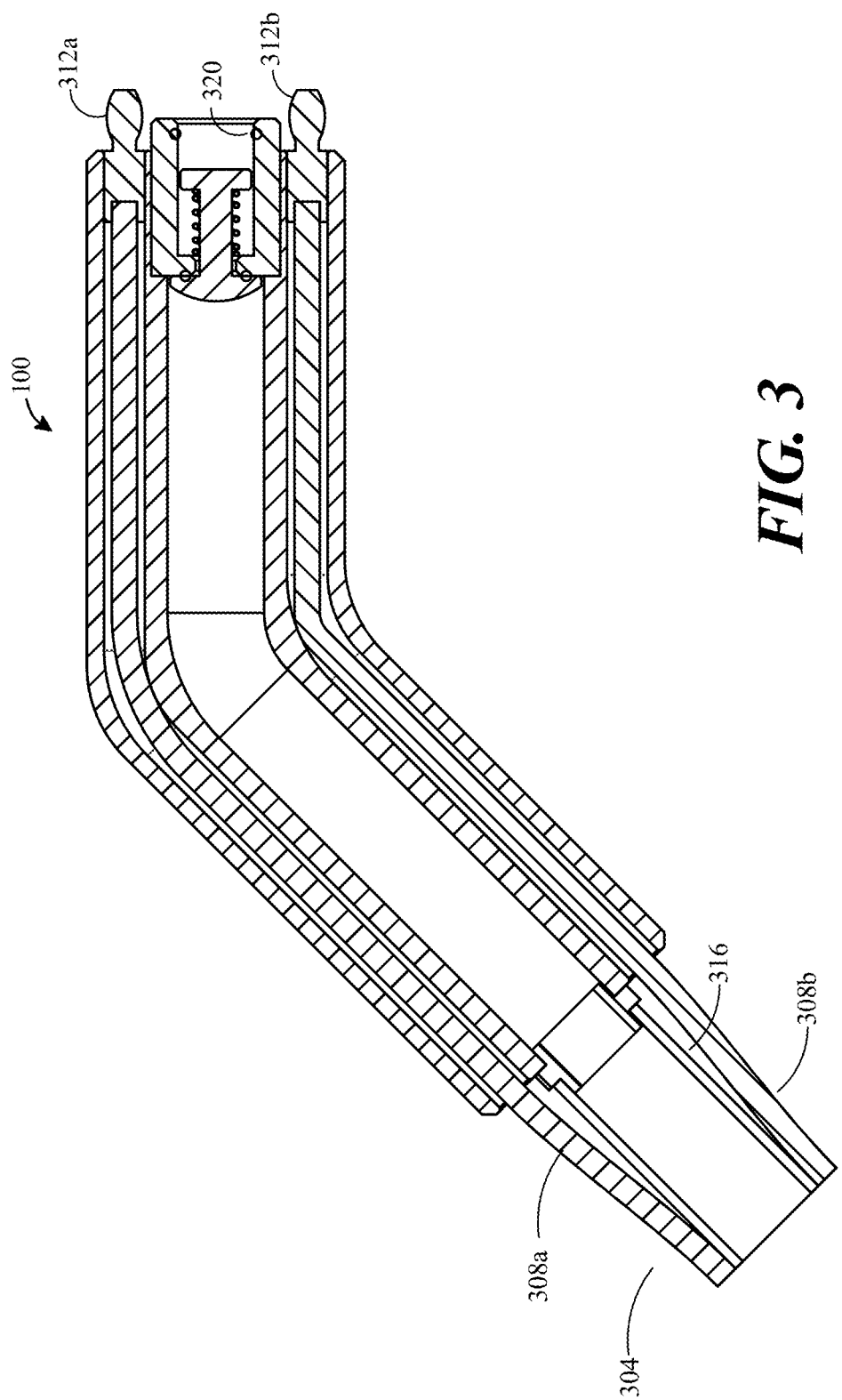
FIG. 3 is a cross-sectional view of an exemplary schematic of an exemplary connector for charging an electric aircraft.

Referring now to FIG. 3, an exemplary cross-sectional view of an exemplary connector 100 is illustrated in accordance with one or more embodiments of the present disclosure. Connector 100 is illustrated with a tether 304. Tether 304 may include one or more conductors and/or coolant flow paths. Connector 100 is shown with a first power conductor and a second power conductor. A first conductor may include a first cable 308a and a first contact 312a in electric communication with the first cable. Likewise, a second conductor may include a second cable 308b and a second contact 312b in electric communication with the second cable. Connector 100 may also include a coolant flow path 316.

As shown in FIG. 3, in some cases, coolant flow path 316 may be configured to mate with a port. For example, coolant flow path 316 may include a fitting within connector 100. In some cases, fitting may include one or more seals 320. Seals may include any seal described in this disclosure and may be configured to seal a joint between coolant flow path 316 and a mating component (e.g., fitting and/or additionally coolant flow path) within port, when connector is attached to the port. As used in this disclosure, a "seal" is a component that is substantially impermeable to a substance (e.g., coolant, air, and/or water) and is designed and/or configured to prevent flow of that substance at a certain location, e.g., joint. Seal may be configured to seal coolant. In some cases, seal may include at least one of a gasket, an O-ring, a mechanical fit (e.g., press fit or interference fit), and the like. In some cases, seal may include an elastomeric material, for example without limitation silicone, buna-N, fluoroelastomer, fluorosilicone, polytetrafluoroethylene, polyethylene, polyurethane, rubber, ethylene propylene diene monomer, and the like. In some cases, seal may include a compliant element, such as without limitation a spring or elastomeric material, to ensure positive contact of seal with a sealing face. In some cases, seal may include a piston seal and/or a face seal. As used in this disclosure, a "joint" is a transition region between two components. For example in some cases, a coolant flow path may have a joint located between connector and electric aircraft port. In some exemplary embodiments, mating of certain components within connector and port occur in prescribed sequence. For example, in some cases, coolant flow path 316 may first be mated and sealed to its mating component within a port, before a valve 324 is opened and/or one or more conductors 312a-b are mated to their respective mating components within the port. In some cases, valve 324 may be configured not to open until after connection of one or more conductors 312a-b. In some embodiments, connector 100 may provide coolant by way of coolant flow path 316 to port. Alternatively or additionally, in some embodiments, connector may include a coolant flow path which is substantially closed and configured to cool one or more conductors.

Figure 4:
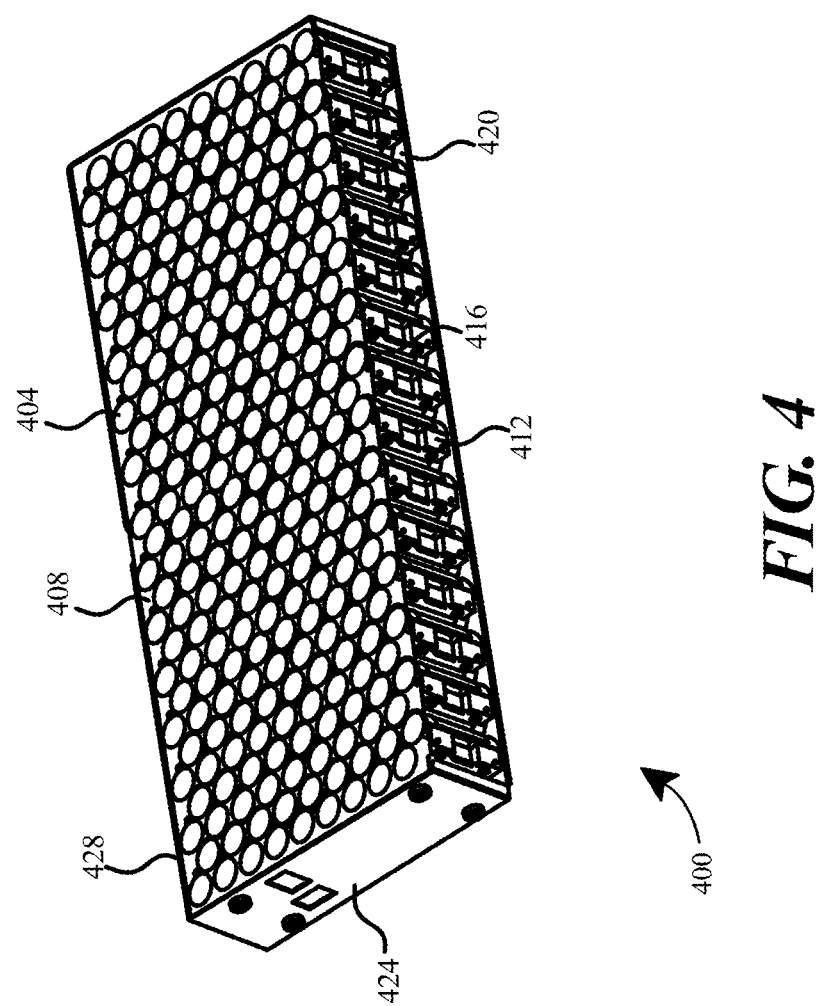
FIG. 4 schematically illustrates an exemplary battery module.

Referring now to FIG. 4, an exemplary energy source is shown in accordance with one or more embodiments of the present disclosure. Battery module 400 with multiple battery units 416 is shown. Battery module 400 may comprise a battery cell 404, cell retainer 408, cell guide 412, protective wrapping, back plate 420, end cap 424, and side panel 428. Battery module 400 may comprise a plurality of battery cells, an individual of which is labeled 404. In embodiments, battery cells 404 may be disposed and/or arranged within a respective battery unit 416 in groupings of any number of columns and rows. For example, in the illustrative embodiment of FIG. 4, battery cells 404 are arranged in each respective battery unit 416 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 4 battery cells 404 are arranged 18 to battery unit 416 with a plurality of battery units 416 comprising battery module 400, one of skill in the art will understand that battery cells 404 may be arranged in any number to a row and in any number of columns and further, any number of battery units may be present in battery module 400. According to embodiments, battery cells 404 within a first column may be disposed and/or arranged such that they are staggered relative to battery cells 404 within a second column. In this way, any two adjacent rows of battery cells 404 may not be laterally adjacent but instead may be respectively offset a predetermined distance. In embodiments, any two adjacent rows of battery cells 404 may be offset by a distance equal to a radius of a battery cell. This arrangement of battery cells 404 is only a non-limiting example and in no way preclude other arrangement of battery cells.

In embodiments, battery cells 404 may be fixed in position by cell retainer 408. For the illustrative purposed within FIG. 4, cell retainer 408 is depicted as the negative space between the circles representing battery cells 404. Cell retainer 408 comprises a sheet further comprising circular openings that correspond to the cross-sectional area of an individual battery cell 404. Cell retainer 408 comprises an arrangement of openings that inform the arrangement of battery cells 404. In embodiments, cell retainer 408 may be configured to non-permanently, mechanically couple to a first end of battery cell 404.

According to embodiments, battery module 400 may further comprise a plurality of cell guides 412 corresponding to each battery unit 416. Cell guide 412 may comprise a solid extrusion with cutouts (e.g. scalloped) corresponding to the radius of the cylindrical battery cell 404. Cell guide 412 may be positioned between the two columns of a battery unit 416 such that it forms a surface (e.g. side surface) of the battery unit 416. In embodiments, the number of cell guides 412 therefore match in quantity to the number of battery units 416. Cell guide 412 may comprise a material suitable for conducting heat.

Battery module 400 may also comprise a protective wrapping woven between the plurality of battery cells 404. Protective wrapping may provide fire protection, thermal containment, and thermal runaway during a battery cell malfunction or within normal operating limits of one or more battery cells 404 and/or potentially, battery module 400 as a whole. Battery module 400 may also comprise a backplate 420. Backplate 420 is configured to provide structure and encapsulate at least a portion of battery cells 404, cell retainers 408, cell guides 412, and protective wraps. End cap 424 may be configured to encapsulate at least a portion of battery cells 404, cell retainers 408, cell guides 412, and battery units 416, as will be discussed further below, end cap may comprise a protruding boss that clicks into receivers in both ends of back plate 420, as well as a similar boss on a second end that clicks into sense board. Side panel 428 may provide another structural element with two opposite and opposing faces and further configured to encapsulate at least a portion of battery cells 404, cell retainers 408, cell guides 412, and battery units 416.

Still referring to FIG. 4, in embodiments, battery module 400 can include one or more battery cells 404. In another embodiment, battery module 400 comprises a plurality of individual battery cells 404. Battery cells 404 may each comprise a cell configured to include an electrochemical reaction that produces electrical energy sufficient to power at least a portion of an electric aircraft and/or a cart 100. Battery cell 404 may include electrochemical cells, galvanic cells, electrolytic cells, fuel cells, flow cells, voltaic cells, or any combination thereof—to name a few. In embodiments, battery cells 404 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 404 may use the term "wired", but one of ordinary skill in the art would appreciate that this term is synonymous with "electrically connected", and that there are many ways to couple electrical elements like battery cells 404 together. As an example, battery cells 404 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 404 may be wired in a series-parallel circuit which combines characteristics of the constituent circuit types to this combination circuit. Battery cells 404 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 404 and therefore cell retainer 408 openings are shifted one half-length so that no two battery cells 404 are directly next to the next along the length of the battery module 400, this is the staggered arrangement presented in the illustrated embodiment of FIG. 4. Cell retainer 408 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 408 may comprise staggered openings that align with battery cells 404 and further configured to hold battery cells 404 in fixed positions. Cell retainer 408 may comprise an injection molded component. Injection molded component may comprise a component manufactured by injecting a liquid into a mold and letting it solidify, taking the shape of the mold in its hardened form. Cell retainer 408 may comprise liquid crystal polymer, polypropylene, polycarbonate, acrylonitrile butadiene styrene, polyethylene, nylon, polystyrene, polyether ether ketone, to name a few. Cell retainer 408 may comprise a second cell retainer fixed to the second end of battery cells 404 and configured to hold battery cells 404 in place from both ends. The second cell retainer may comprise similar or the exact same characteristics and functions of first cell retainer 408. Battery module 400 may also comprise cell guide 412. Cell guide 412 includes material disposed in between two rows of battery cells 404. In embodiments, cell guide 412 can be configured to distribute heat that may be generated by battery cells 404.

According to embodiments, battery module 400 may also comprise back plate 420. Back plate 420 is configured to provide a base structure for battery module 400 and may encapsulate at least a portion thereof. Backplate 420 can have any shape and includes opposite, opposing sides with a thickness between them. In embodiments, back plate 420 may comprise an effectively flat, rectangular prism shaped sheet. For example, back plate 420 can comprise one side of a larger rectangular prism which characterizes the shape of battery module 400 as a whole. Back plate 420 also comprises openings correlating to each battery cell 404 of the plurality of battery cells 404. Back plate 420 may comprise a lamination of multiple layers. The layers that are laminated together may comprise FR-4, a glass-reinforced epoxy laminate material, and a thermal barrier of a similar or exact same type as disclosed hereinabove. Back plate 420 may be configured to provide structural support and containment of at least a portion of battery module 400 as well as provide fire and thermal protection.

According to embodiments, battery module 400 may also comprise first end cap 424 configured to encapsulate at least a portion of battery module 400. End cap 424 may provide structural support for battery module 400 and hold back plate 420 in a fixed relative position compared to the overall battery module 400. End cap 424 may comprise a protruding boss on a first end that mates up with and snaps into a receiving feature on a first end of back plate 420. End cap 424 may comprise a second protruding boss on a second end that mates up with and snaps into a receiving feature on sense board.

Battery module 400 may also comprise at least a side panel 428 that may encapsulate two sides of battery module 400. Side panel 428 may comprise opposite and opposing faces comprising a metal or composite material. In the illustrative embodiment of FIG. 4, a second side panel 428 is present but not illustrated so that the inside of battery module 400 may be presented. Side panel(s) 428 may provide structural support for battery module 400 and provide a barrier to separate battery module 400 from exterior components within aircraft or environment.

Figure 5:
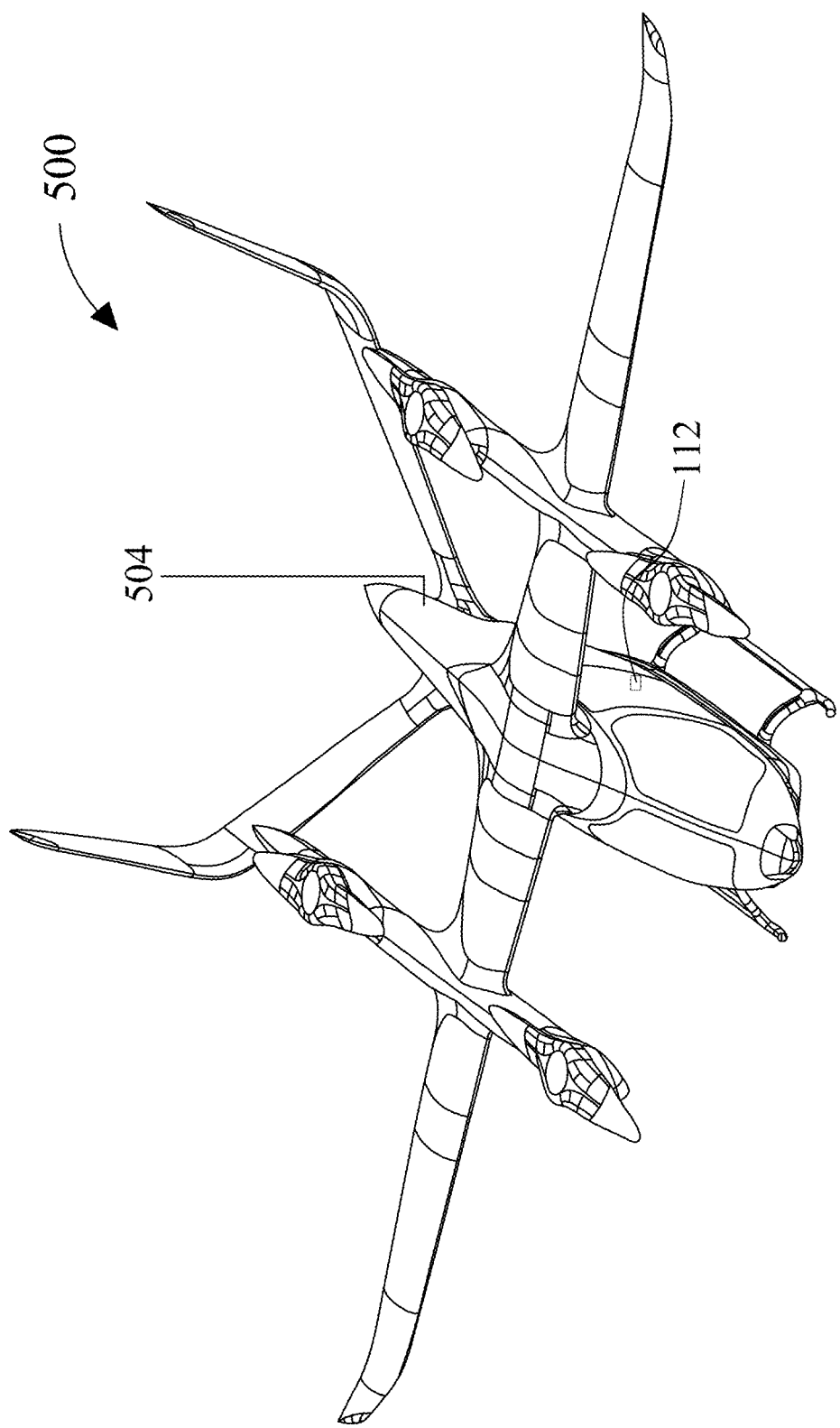
FIG. 5 is a schematic of an exemplary electric aircraft.

Referring now to FIG. 5, an exemplary embodiment of an aircraft 500 is illustrated. Aircraft 116 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 5, aircraft 500 may include a fuselage 504. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 504 may comprise structural elements that physically support the shape and structure of an aircraft. Structural elements may take a plurality of forms, alone or in combination with other types. Structural elements may vary depending on the construction type of aircraft and specifically, the fuselage. Fuselage 504 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper. In one or more embodiments, electric aircraft 116 includes port 112. In one or more embodiments port 112 may be disposed within fuselage.

Still referring to FIG. 5, port 112 may be electrically connected to an energy source of electric aircraft 500. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 5, aircraft 500 may include a sensor. Sensor may include any sensor or noise monitoring circuit. Sensor may be configured to sense a characteristic of charging connection or condition and/or parameter of a power source of electric aircraft 116. Sensor may be a device, module, and/or subsystem, utilizing any hardware, software, and/or any combination thereof to sense a characteristic and/or changes thereof, in an instant environment, for instance without limitation controller, which the sensor is proximal to or otherwise in a sensed communication with, and transmit information associated with the characteristic, for instance without limitation digitized data. Sensor may be mechanically and/or communicatively connected to aircraft 500. In other embodiments, sensor may be communicatively connected to charger 104. Sensor may be configured to sense a characteristic associated with a power source of electric aircraft, such as a critical condition (e.g., overheating, overcurrent, gas detection, cell failure byproduct detection, moisture detection, and the like) and may transmit a control signal to controller 104 to terminate charging connection. Sensor may include one or more proximity sensors, position sensor, displacement sensors, vibration sensors, photoelectric sensors, infrared sensors, pressure sensor, electrical sensors, such as voltmeters and current sensors, moisture, sensors, chemical sensors, gas sensors, and the like. Sensor may be used to monitor the status of aircraft 500 for both critical and non-critical functions. Sensor may be incorporated into vehicle or aircraft or be remote.

In some cases, sensor 516 may sense a characteristic as an analog measurement, for instance, yielding a continuously variable electrical potential indicative of the sensed characteristic. In these cases, sensor 516 may additionally comprise an analog to digital converter (ADC) as well as any additionally circuitry, such as without limitation a Whetstone bridge, an amplifier, a filter, and the like. In one or more embodiments, sensor 516 may sense a characteristic through a digital means or digitize a sensed signal natively.

Still referring to FIG. 5, electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Figure 6:
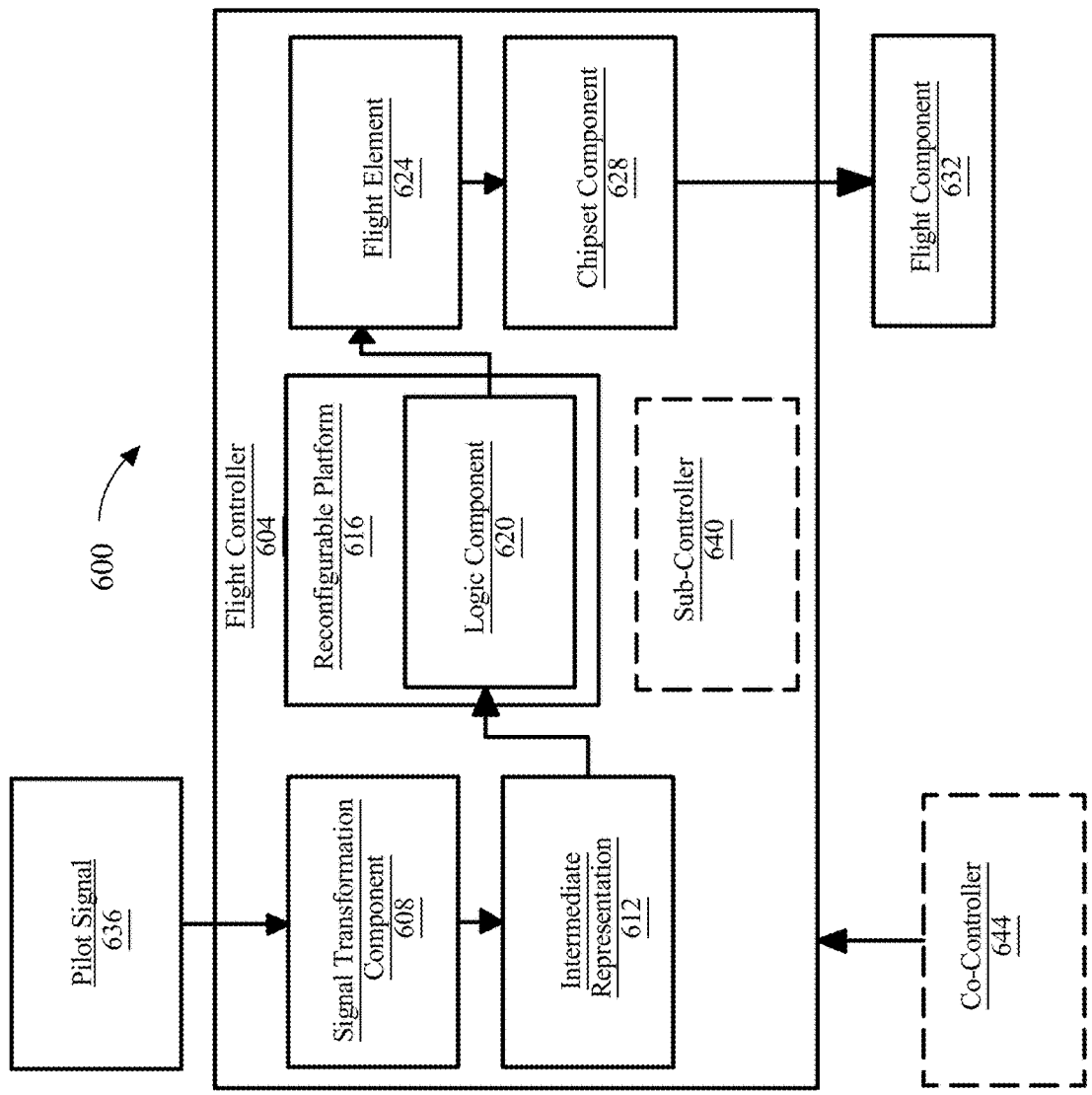
FIG. 6 is a block diagram depicting an exemplary flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
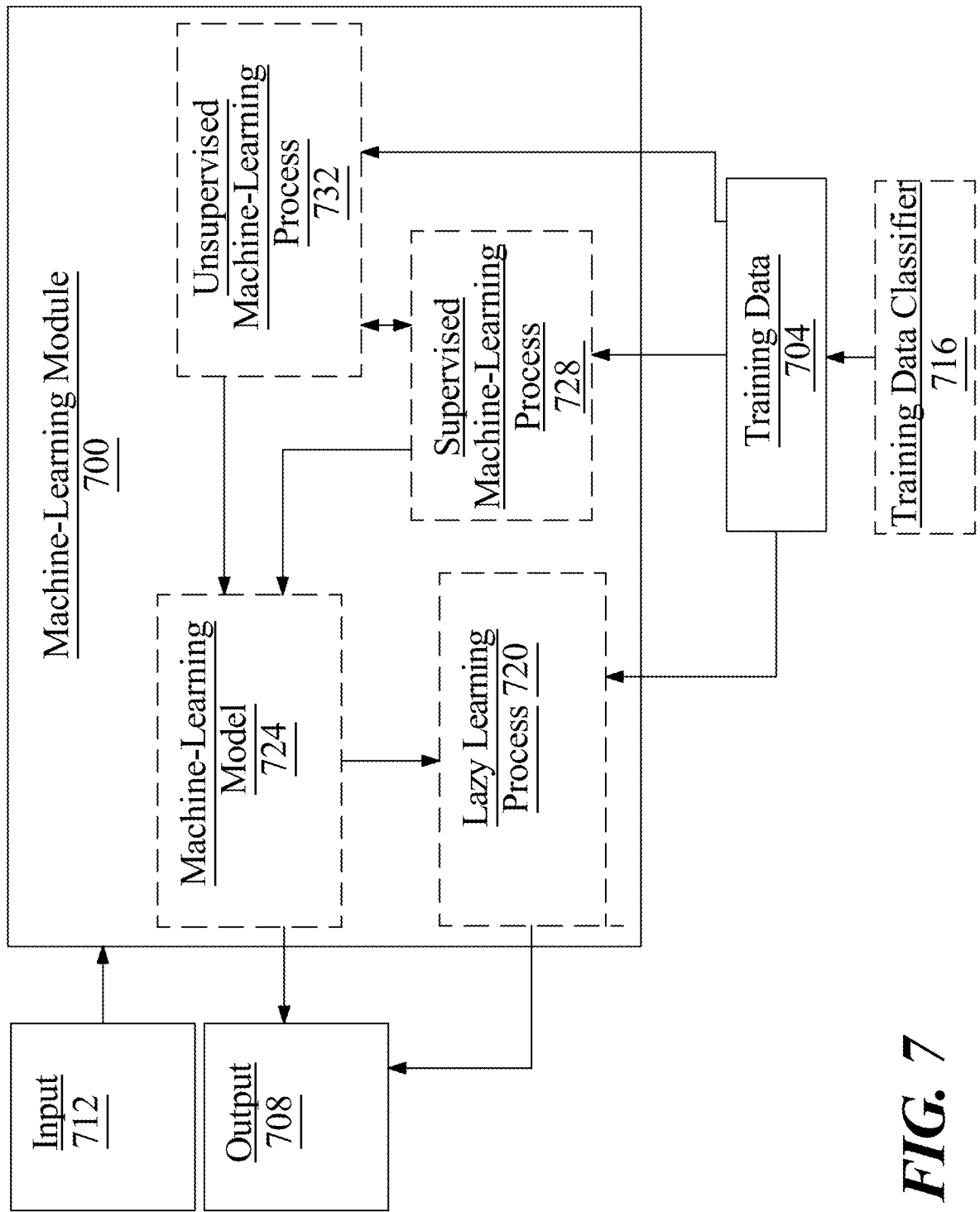
FIG. 7 is a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below.

Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
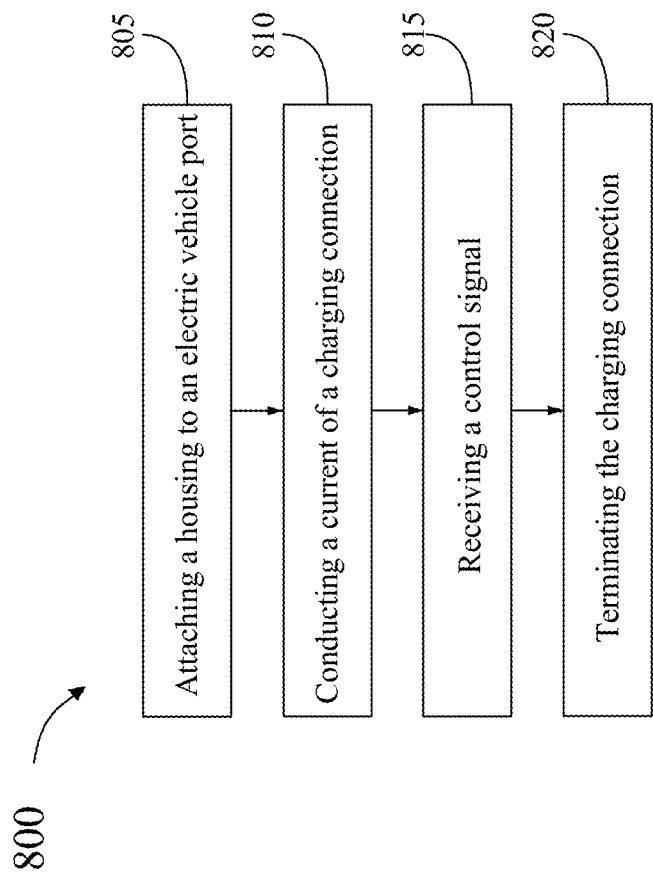
FIG. 8 is a flow diagram illustrating an exemplary method of use for an exemplary ground support cart.

Referring now to FIG. 8, an exemplary method 800 of terminating a charging connection between charger 108 and electric aircraft 116 using connector 100 is shown in accordance with one or more embodiments of the present disclosure. As shown in step 805, method 800 includes attaching, by fastener 144 of housing 140 of connector 100, housing 140 to electric aircraft port 112 of electric aircraft 116 to facilitate charging connection between charger 108 and electric aircraft 116.

As shown in step 810, method 800 includes conducting, by conductor 120 of connector 100, a current of charging connection. In one or more embodiments, method 800 further includes, detecting, by a sensor, a characteristic of charger 108. In one or more embodiments, a characteristic of charger 108 may include a characteristic of connector 100. For instance, sensor may detect a mechanical communication and/or electric communication between electric aircraft 116 and connector 100. For example, and without limitation, a characteristic of charger 108 may include a status of fastener, where the status of fastener may include attached or detached from port 112. In another example, and without limitation, a characteristic of charger 108 includes a status of a current of conductor 120. Sensor 132 may detect when charger 108 is supplying or receiving a current from an energy source of electric aircraft 116. In one or more embodiments method 800 further includes charging, by conductor 120, a battery of electric aircraft 116. In some embodiments, conductor 120 includes a direct current conductor configured to conduct a direct current. In other embodiments, conductor 120 includes an alternating current conductor configured to conduct an alternating current. In one or more embodiments, method 800 further includes communicatively connecting, by an electrical sensor, to charging connection and detecting the current of charging connection.

As shown in step 815, method 800 includes receiving, by controller 104 of connector 100, a control signal from remote device 128. In one or more embodiments, remote device 128 may include a remote user device, such as a mobile phone, a laptop, a desktop, a tablet, or the like. In other embodiments, remote device 128 may include a graphic user interface, such as display. In other embodiments, remote device 128 may include a control panel in a cockpit of electric aircraft 116, in a control tower, or the like. In one or more embodiments, remote device 128 may include a fleet management system where a third party may terminate charging connection. In one or more embodiments, remote device may include a switch, button, toggle, joystick, lever, slider, touchscreen, or other user control input to input a command to terminate the charging connection so that remote device may generate a control signal that is then transmitted to controller 104 of connector 100. Control signal may be transmitted wirelessly or through a wired connection between controller 104 and remote device 128, as previously mentioned in this disclosure.

As shown in step 820, method 800 includes terminating, by controller 104, charging connection between charger 108 and electric aircraft 116 as a function of the control signal. In one or more embodiments, charging connection includes an electric communication and a mechanical communication. For example, an electric communication includes a current being exchanged between electric aircraft 116 and energy source 124 of charger 108. In one or more embodiments, step 820 of method 800 further includes disengaging, by controller 104, the electric communication to terminate the charging connection between the charger and the electric aircraft. Furthermore, in one or more embodiments, step 820 of method 800 further includes disconnecting, by controller 104, the mechanical communication of the charging connection between the charger and the electric aircraft by detaching the fastener of the connector from the electric aircraft port.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
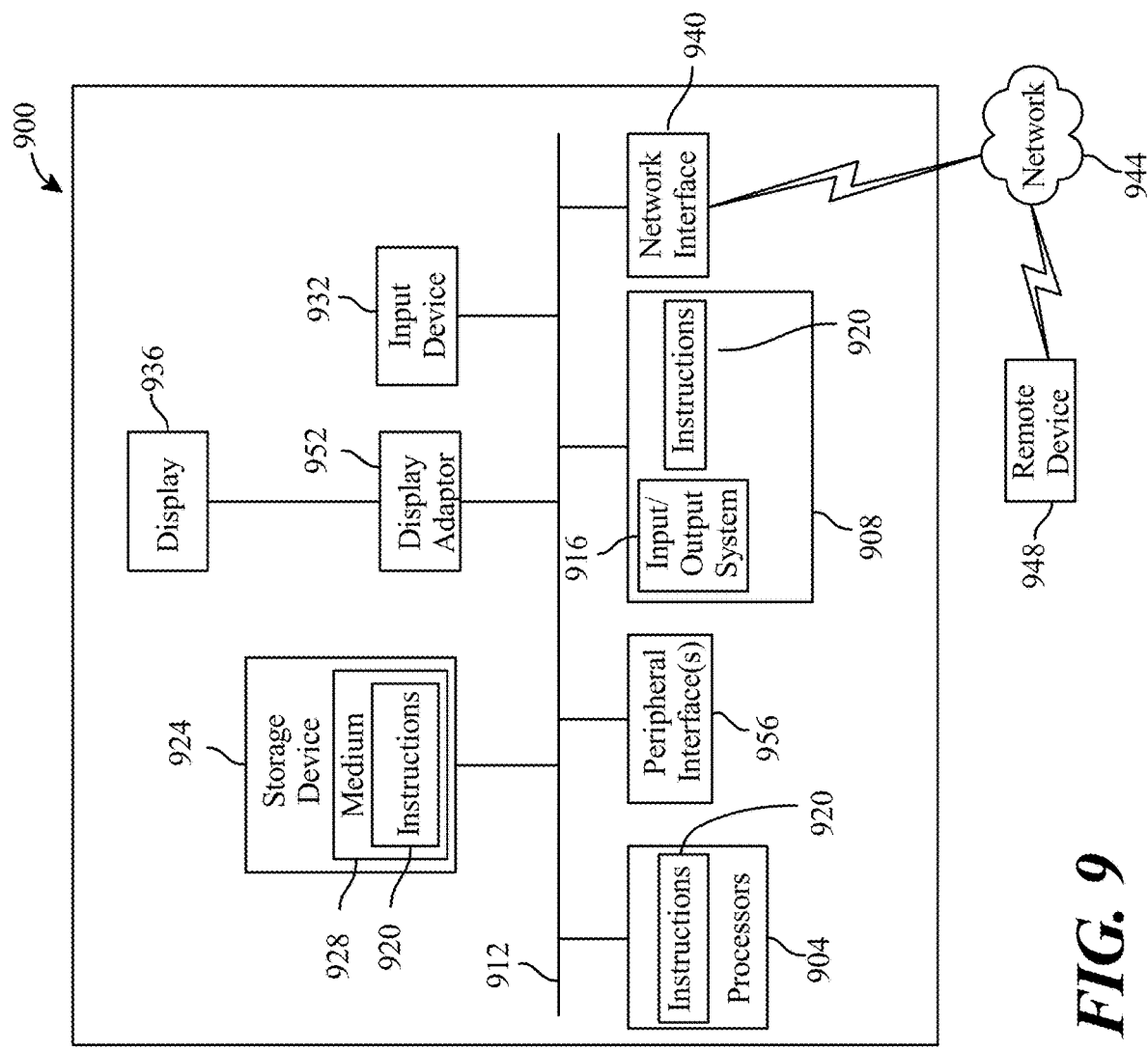
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A connector of an electric aircraft charger, the connector comprising:
   a housing configured to attach with an electric aircraft port of an electric aircraft to facilitate
   a charging connection between the charger and the electric aircraft, wherein the housing comprises a fastener for removable attachment with the electric aircraft port, wherein the charging connection comprises an electric communication and a mechanical coupling;
   a contactor, wherein the contactor is configured to selectively disengage the electric communication of the charging connection;
   a conductor configured to conduct a current of the charging connection;
   a control circuit configured to control the electric communication to terminate and reengage the charging connection between the charger and the electric aircraft by actions including:
   terminate the charging connection between the charger and the electric aircraft using the contactor a in response to receiving a first control signal from a remote device; and
   reengage the charging connection using the contactor in response to receiving a second control signal from the remote device.

2. The connector of claim 1, wherein the contactor comprises a solenoid.

3. The connector of claim 1, wherein the contactor comprises a contact protection configured to prevent electrical arcing during use of the contactor.

4. The connector of claim 1, wherein the contractor comprises a relay.

5. The connector of claim 1, wherein the fastener comprises an electromagnet.

6. The connector of claim 1, wherein the control circuit is further configured to control a parameter of an electrical charging current of the charging connector as a function of the control signal.

7. The connector of claim 1, further comprising a proximity sensor, wherein the proximity signal sensor is configured to detect a proximity signal.

8. The connector of claim 7, further comprising a proximity signal conductor in electrical communication with the proximity sensor, wherein the proximity signal conductor is configured to conduct the proximity signal.

9. The connector of claim 1, further comprising a sensor, wherein the sensor is configured to detect a characteristic of the charger, wherein the characteristic of the charger comprises a change in current through the connector.

10. A method of terminating a charging connection using a connector, the method comprising:
    attaching, by a fastener of a housing of the connector, the housing of the connector to an electric aircraft port of an electric aircraft to facilitate a charging connection between the charger and the electric aircraft, wherein the charging connection comprises an electric communication and a mechanical coupling;
    conducting, by a conductor of the connector, a current of the charging connection;
    terminating, by the control circuit, the charging connection between the charger and the electric aircraft using a contactor in response to a first control signal from a remote device, wherein the contactor is configured to selectively disengage the electric communication of the charging connection;
    reengaging, by the control circuit, the charging connection using the contactor in response to receiving a second control signal from the remote device.

11. The method of claim 10, wherein the contactor comprises a solenoid.

12. The method of claim 10, wherein the contactor comprises a contact protection configured to prevent electrical arcing during use of the contactor.

13. The method of claim 10, wherein the contractor comprises a relay.

14. The method of claim 10, wherein the fastener comprises an electromagnet.

15. The method of claim 1, further comprising controlling, by the control circuit, a parameter of an electrical charging current of the charging connector as a function of the control signal.

16. The method of claim 10, further comprising detecting a proximity signal using a proximity sensor.

17. The method of claim 16, further comprising conducting the proximity signal using a proximity signal conductor in electrical communication with the proximity sensor.

18. The method of claim 10, further comprising detecting a charging characteristic of the charger by the sensor, wherein the characteristic of the charger includes a change in current through the connector.

* * * * *